March 2, 1943.　　　J. M. HUDSON　　　2,312,553
AIRPLANE TAIL WHEEL STRUCTURE
Filed Aug. 27, 1941　　　2 Sheets-Sheet 1
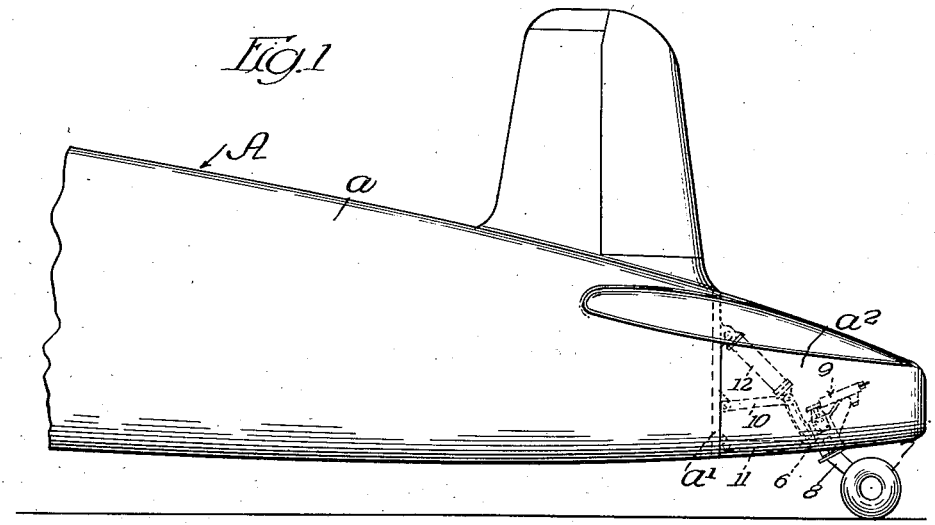
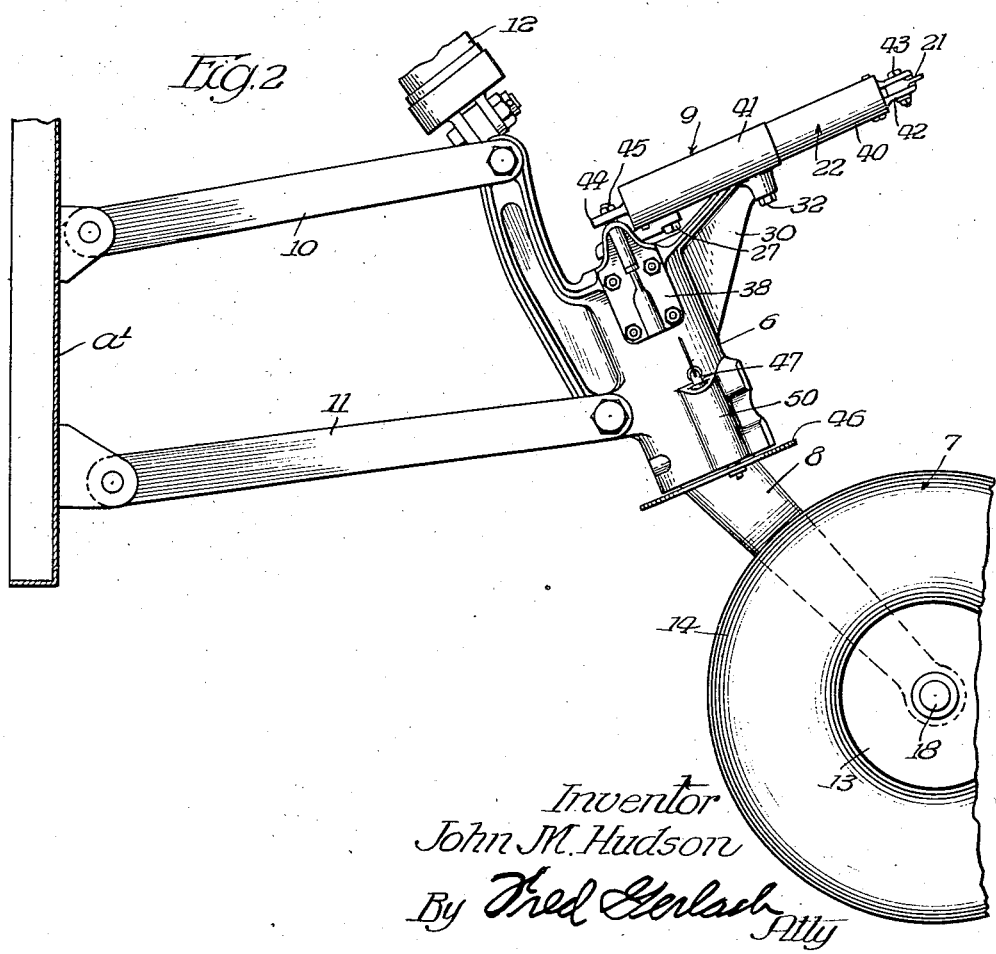
Inventor
John M. Hudson
By Fred Gerlach Atty March 2, 1943.  J. M. HUDSON  2,312,553
AIRPLANE TAIL WHEEL STRUCTURE
Filed Aug. 27, 1941  2 Sheets-Sheet 2
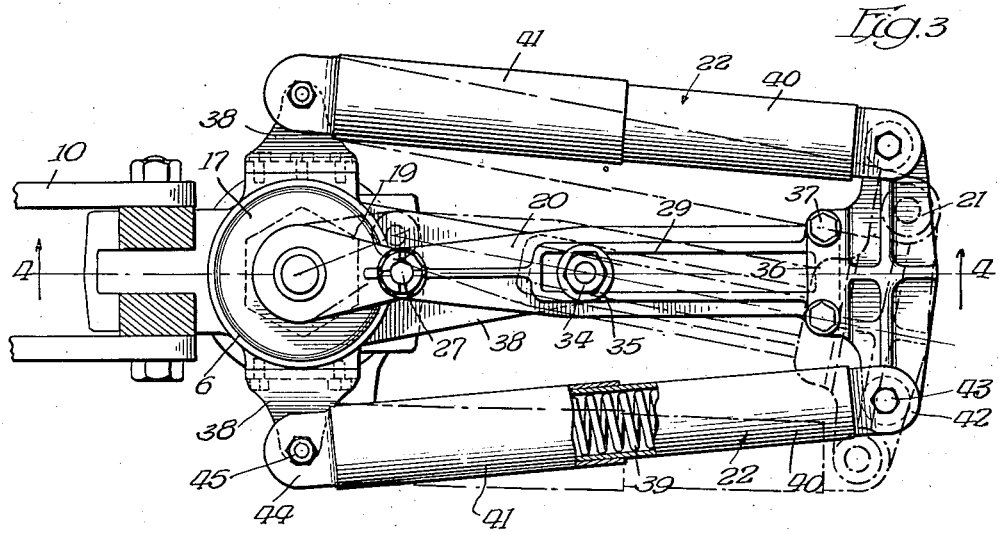
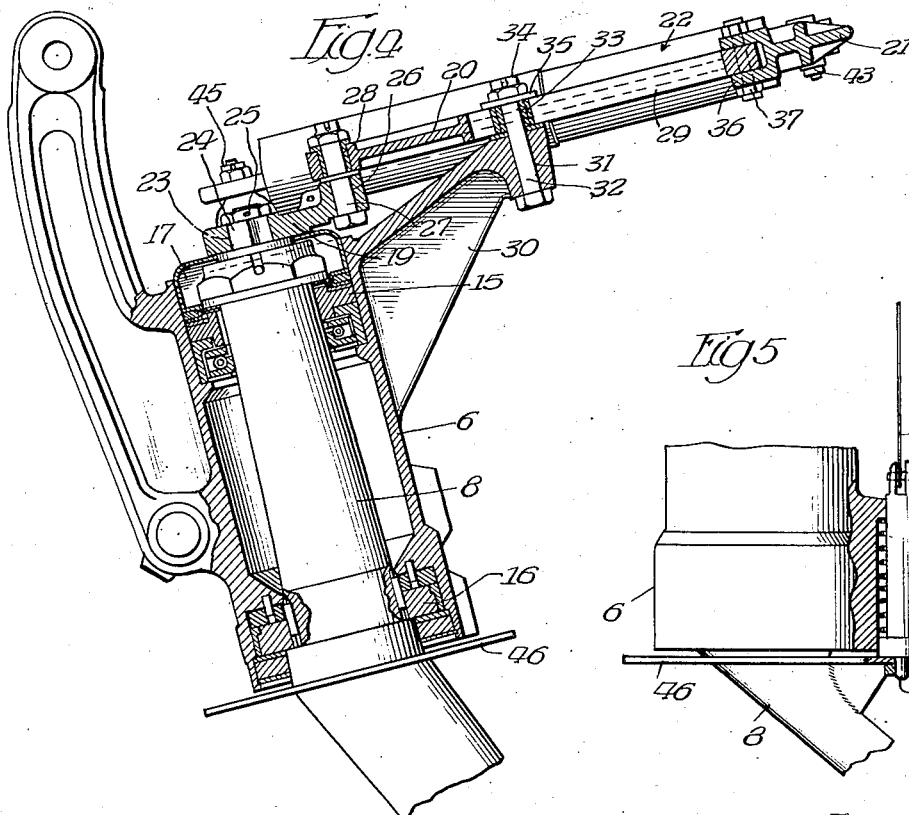
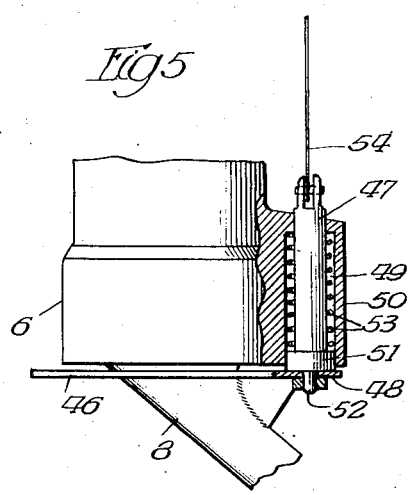
Inventor
John M. Hudson
By Fred Gerlach
Atty Patented Mar. 2, 1943

2,312,553

UNITED STATES PATENT OFFICE 2,312,553

AIRPLANE TAIL WHEEL STRUCTURE

John M. Hudson, Downey, Calif., assignor to Vultee Aircraft, Inc., Vultee Field, Calif., a corporation of Delaware Application August 27, 1941, Serial No. 408,432

14 Claims. (Cl. 244—109)

The present invention relates generally to tail wheel structures for airplanes. More particularly the invention relates to that type of airplane tail wheel structure which is of the self-centering variety, serves as a medium for supporting the tail end of the fuselage when the airplane is on the ground and comprises a housing at the rear end of the airplane fuselage, a tail wheel, an upstanding shaft embodying at its lower end a laterally extending axle for the tail wheel and having its upper end journalled in the housing so that it together with the tail wheel is permitted to swivel, and mechanism or means for automatically returning the tail wheel to its neutral or centered position after deflection or angular displacement thereof in connection with travel of the airplane over the ground.

The primary object of the invention is to provide a self-centering tail wheel structure of this type which is an improvement upon, and has certain inherent advantages over, previously designed airplane tail wheel structures and is characterized by the fact that the mechanism for automatically centering the tail wheel is of novel design or construction and is not only compact and comparatively light in weight but also extremely efficient in operation.

Other objects of the invention and the various advantages and characteristics of the present airplane tail wheel structure will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a fragmentary side view of the tail end of an airplane having associated therewith a self-centering tail wheel structure embodying the invention;

Figure 2 is an enlarged fragmentary side view of the tail wheel structure illustrating the manner in which the housing is supported with respect to the rear bulkhead of the fuselage;

Figure 3 is a plan view of the structure showing in detail the construction and design of the mechanism or means for automatically effecting self-centering of the tail wheel;

Figure 4 is a vertical longitudinal section taken on the line 4—4 of Figure 3 and illustrating the manner in which the upper end of the upstanding wheel-carrying shaft is journalled in the housing so that the shaft and wheel are permitted to swivel in connection with ground travel of the airplane with which the wheel structure is associated; and Figure 5 is a view partly in section and partly in side elevation of the spring pressed plunger and apertured ring for optionally or selectively locking the shaft and wheel against rotation relatively to the housing.

The tail wheel structure which is shown in the drawings constitutes the the preferred form or embodiment of the invention. It is essentially of the so-called self-centering type or variety and is illustrated in connection with an airplane A embodying a fuselage $a$. The fuselage is of conventional or standard construction and comprises at the tail end thereof a rear bulkhead $a^1$ and a conoidal tailpiece $a^2$ behind the bulkhead. The tailpiece is suitably secured to the bulkhead as well understood in the art and has an opening in the bottom thereof for accommodating the tail wheel structure. The latter serves as a medium for supporting the rear or tail end of the fuselage when the airplane A is on the ground, and comprises as its main parts a tubular housing 6, a tail wheel 7, a shaft 8 and a mechanism 9 for automatically effecting self-centering of the tail wheel, that is, effecting return of the tail wheel to its centered or neutral position after deflection or angular displacement thereof in connection with travel of the airplane on the ground.

The housing 6 is preferably in the form of a one-piece casting of aluminum or other light metal. It is located in the tailpiece $a^2$ of the airplane fuselage $a$ and is supported for vertical movement relatively to the fuselage by way of a pair of vertically spaced parallel arms 10 and 11. The latter extend rearwards from the bulkhead $a^1$ and are disposed in the tailpiece $a^2$. The front ends of the arms 10 and 11 are pivotally connected to brackets on the bulkhead $a^1$ so that the arms are free to swing vertically. The rear ends of the arms are pivotally connected to the housing 6 of the tail wheel structure, as shown in Figure 2. A shock absorber 12 is applied to the housing 6 and serves as a cushioning means for the tail wheel structure during landing of the airplane or travel of the airplane on the ground. The arms 10 and 11 permit the housing to move upwards and serve in addition to prevent rotation of the housing about its axis.

The tail wheel 7 is essentially a ground wheel and is disposed beneath the housing 6. It is carried by the shaft 8 and comprises a hub 13 and a pneumatic tire 14. The shaft 8 is disposed in an upstanding position and has a tapered upper end. The latter, as best shown in Figure 4, extends through the tubular housing 6 and is journalled in an upper bearing 15 and a lower bearing 16 so that the shaft together with the tail wheel 7 is free to swivel. The bearing 15 is confined within the upper end of the housing 6 and the lower bearing 16 is mounted in the lower end of the housing. The upper extremity of the shaft 8 projects beyond or above the upper end of the housing 6 and carries a shield 17 for guarding the upper bearing 15 against dust. The lower end of the shaft 8 is laterally offset with respect to the upper end and is provided at its bottom extremity with a laterally extending axle 18. The latter extends through the hub 13 of the tail wheel 7 and serves to connect the tail wheel to the shaft. The lateral offset of the lower end of the shaft 8 is such that the tail wheel 7 is in centred relation with the axis about which the upper end of the shaft is rotatably mounted. The bearings 15 and 16 in the housing are so arranged or designed that the shaft is held against axial displacement.

The mechanism 9 for effecting automatic self-centering of the tail wheel comprises a crank 19, a lever 20, a cross arm 21 and a pair of spring assemblies 22. The crank 19 is fixed to, and projects radially from, the upper extremity of the tail wheel carrying shaft 8. The inner end of the crank is provided with a polygonal hole 23 for a correspondingly shaped reduced stem 24 on the upper end of the shaft. A bolt 25 serves to hold the crank 19 in locked or rigid relation with the shaft 8. The shank of this bolt fits within an internally threaded socket in the central portion of the stem 24 and the head of the bolt overlies the portion of the inner end of the crank that defines the polygonal opening 23. The crank is arranged so that it extends rearwards when the tail wheel is in its truly centered or neutral position. The outer end of the crank is provided with a socket 26 and an upstanding bolt 27 extends through and fits loosely within this socket. The lever 20 is in the form of a one-piece casting and extends rearwardly from the crank 19. The front end of the lever is provided with a socket 28 through which the upper end of the bolt 27 extends. The bolt constitutes a pivotal connection between the rear or outer end of the crank 19 and the front end of the lever 20. A longitudinally extending slot 29 is formed in the central portion and rear end of the lever. This slot is of uniform width from end to end, as shown in Figure 3. The central portion of the lever is supported by way of a bracket 30, which is formed integrally with, and projects rearwards from, the upper portion of the housing 6. The outer or rear end of the bracket is provided with an upstanding socket 31 for a bolt 32. The upper end of this bolt extends or projects beyond the upper end of the socket and fits within the front portion of the longitudinal slot 29 in the lever 20, as shown in Figures 3 and 4 of the drawings. The bolt 32 constitutes a central fulcrum for the lever and results in the lever rocking in response to angular displacement of the crank 19 due to turning or swinging of the tail wheel 7 and shaft 8. The slot 29 permits the lever to slide longitudinally in connection with rocking thereof. A collar or sleeve 33 surrounds the upper end of the bolt 32 and constitutes an anti-friction element for permitting the lever to rock and slide freely relatively to the bolt 32. A nut 34 and a washer 35 on the upper end of the bolt 32 prevent axial displacement of the bolt with respect to the socket 31 at the outer end of the bracket 30. When the crank 19 is caused to swing in a clockwise direction as viewed in Figure 3 the lever 20, due to the fulcrum which is provided or formed by the bolt 32, is caused to swing or rock in a clockwise direction. Opposite or reverse swinging of the crank 19 results in counterclockwise swinging of the lever. The cross arm 21 of the self-centering mechanism 9 is connected to the rear end of the lever 20 and is preferably in the form of a one-piece casting. The central front portion of the cross arm is provided with a pair of vertically spaced integral lugs 36 and these are arranged in straddled relation with the rear end of the lever and are connected to the latter by way of bolts 37. The ends of the cross arm project outwardly in opposite directions and are of equal length. The spring assemblies 22 are located at opposite sides of the lever 20 and extend between the outer ends of a pair of diametrically opposite brackets 38 on the upper end of the housing 6 and the ends of the cross arm 21. They serve to supply the force for centering the tail wheel and are the same in size, design and construction. Each of the assemblies 22 comprises a compression spring 39 and a telescopic covering for the spring in the form of a tubular rear member 40 and a tubular front member 41. The coverings of the two assemblies surround and house the compression spring 39, as shown in Figure 3. The tubular rear members 40 surround the rear ends of the springs and have rear end closures with outwardly extending lugs 42. Such lugs lap the ends of the cross arm 21 and are pivotally connected to the cross arm by way of bolts 43. The tubular front members 41 of the assembly coverings surround the front ends of the springs 39 and are of greater diameter than the rear members 40. The rear ends of the front members 41 extend around and are slidably mounted with respect to the front ends of the members 40 and the front ends of the front members 41 are provided with closures having forwardly extending lugs 44 which overlie the outer ends of the brackets 38 and are pivotally connected to such brackets by way of pivot type bolts 45. The brackets 38 are bolted or otherwise fixedly secured to the upper side portions of the housing 6. The springs 37 of the assemblies 22 are similarly loaded and tend to maintain the lever 20 and the crank 19 in a position wherein they are in true alignment and hold the tail wheel 7 in a true centered or neutral position with respect to the fuselage a of the airplane A. In the event that the lever 20 is rocked about the bolt 32 due to angular displacement of the crank resulting from turning of the tail wheel the cross arm 21 is caused to swing with the lever 20 and operates to compress one of the spring assemblies 22 and elongate the other spring assembly. When the springs of the spring assemblies are under unequal compression the one under the most compression tends to return the lever 20 to its normal position and causes restoration of the tail wheel 7 to its proper centered position. When the lever 20 is rocked in one direction one of the spring assemblies is compressed while the other is elongated, as heretofore described, and when the lever is rocked in the opposite or reverse direction the other spring assembly is compressed and the one spring assembly is elongated. The assemblies, due to proper balancing or loading of the springs 39, tend automatically to return the tail wheel to its neutral position.

In addition to the housing 6, tail wheel 7, shaft 8 and self-centering mechanism 9 the structure comprises an apertured ring 46 and a spring-pressed plunger 47 for releasably locking the shaft 8 against rotation relatively to the housing 6. The ring 46 surrounds the central portion of the shaft 8 and is welded or otherwise fixedly secured in place. It underlies the lower end of the housing 6 and has an annular series of apertures 48 therein. The plunger 47 is slidably mounted in a socket 49 in a lug 50 on the lower rear portion of the housing 6. It overlies the rear portion of the ring 46 and is slidable in the socket to and from the ring. The lower end of the plunger is provided with a head 51 and the latter, as shown in Figure 5, embodies on the bottom face thereof a small protuberance 52 which is adapted to fit within any one of the apertures 48. A compression spring 53 surrounds the central portion of the plunger and serves to urge the plunger downwards and bring the protuberance 52 into locked relation with any one of the ring apertures 48 which is therebeneath. The lower end of the spring abuts against the head 51 and the upper end of the spring abuts against the upper end of the socket 49. When the protuberance 52 is in any one of the apertures 48 the shaft 8 and the tail wheel 7 are locked against turning relatively to the housing 6. The upper end of the plunger projects above the lug 20 and is attached to one end of a plunger-retracting cable 54. The latter leads to the pilot's compartment of the airplane A and is adapted when pulled to raise the plunger. When the plunger is raised so that the protuberance 52 is out of engagement with the ring the shaft and tail wheel are free to swivel or turn with respect to the housing 6. The apertured ring 46 and the plunger 47 constitute simple means for releasably locking the shaft and tail wheel in any desired angular position. It is to be understood that during normal use of the airplane the plunger is maintained in its retracted position so that the tail wheel is free to swivel.

The herein described airplane tail wheel structure efficiently and effectively serves its intended purpose due to the arrangement and design of the self-centering mechanism 9. The latter is in the form of a compact unit and, therefore, takes up but a comparatively small space within the tailpiece of the airplane fuselage. By reason of the fact that the spring assemblies 22 of the mechanism 9 are applied to the cross arm 21 at the rear end of the lever 20 and the lever 20 is centrally fulcrumed the necessary or proper leverage is obtained for causing the crank 19 to return the tail wheel to its center or neutral position.

The invention is not to be understood as restricted to the details set forth since these may be modified within the scope of the appended claims without departing from the spirit and scope of the invention.

Having thus described my invention what I claim as new and desire to secure by Letters Patent is:

1. In combination with an airplane tail wheel structure including a tail wheel and an upstanding swivel type shaft for the wheel, mechanism for effecting self-centering of the wheel consisting of a crank connected to the shaft, a single lever having one of its portions pivotally connected to the crank and provided with a fulcrum for another portion thereof, and spring means applied to the lever for urging it into a position wherein it operates through the medium of the crank to center the wheel.

2. In combination with an airplane tail wheel structure including a tail wheel and an upstanding swivel type shaft for the wheel, self-centering mechanism for the wheel consisting of a crank connected to the shaft, a single lever having one end thereof pivotally connected to the crank and its central portion fulcrumed, and means applied to the other end of the lever for urging the lever into a position wherein it operates through the medium of the crank to center the wheel.

3. In combination with an airplane tail wheel structure including a tail wheel and an upstanding swivel type shaft for the wheel, automatic self-centering mechanism for the wheel comprising a crank connected to the shaft, a lever having one end thereof pivotally connected to the outer end of the crank and having its central portion mounted for pivotal and longitudinal sliding movement, and means applied to the other end of the lever for urging the lever into a position wherein it operates through the medium of the crank to center the wheel.

4. In combination with an airplane tail wheel structure including a tail wheel and an upstanding swivel type shaft for the wheel, self-centering mechanism for the wheel consisting of a crank connected to the shaft, a single lever having one end thereof pivotally connected to the crank and its central portion fulcrumed, and a pair of oppositely acting similarly loaded springs applied to the other end of the lever and serving to urge said lever into a position wherein it operates through the medium of the crank to center the wheel.

5. In combination with an airplane tail wheel structure including a tail wheel and an upstanding swivel type shaft for the wheel, self-centering mechanism for the wheel comprising a crank connected to the shaft, a lever having one end thereof operatively connected to the crank and the central portion fulcrumed, a cross arm having the central portion thereof connected to the other end of the lever, and a pair of oppositely acting similarly loaded springs applied to the ends of the cross arm and serving to urge the lever into a position wherein it operates through the medium of the crank to center the wheel.

6. In combination with an airplane tail wheel structure including a tail wheel and an upstanding swivel type shaft for the wheel, self-centering mechanism for the wheel comprising a crank connected to the shaft, a lever having one end thereof operatively connected to the crank and the central portion fulcrumed, a cross arm having the central portion thereof connected to the other end of the lever, a pair of compression springs positioned along opposite sides of the lever and applied to the ends of the cross arm in such manner that they serve to urge the lever into a position wherein it operates through the medium of the crank to center the wheel.

7. In combination with an airplane tail wheel structure including a tail wheel and an upstanding swivel type shaft for the wheel, self-centering mechanism for the wheel comprising a crank connected to the shaft, a lever having one end thereof pivotally connected to the outer end of the crank and having a longitudinally extending slot in its central portion, means extending through the slot and serving as a fulcrum for the lever while at the same time permitting longitudinal sliding movement of said lever, and spring means applied to the other end of the lever for urging the lever into a position wherein it operates through the medium of the crank to center the wheel.

8. In combination with an airplane tail wheel structure including a tail wheel and an upstanding swivel type shaft for the wheel, self-centering mechanism for the wheel comprising a crank connected to the shaft, a lever having one end thereof pivotally connected to the outer end of the crank and having a longitudinally extending slot and serving as a fulcrum for the lever while at the same time permitting longitudinal sliding movement of said lever, a cross arm having the central portion thereof connected to the other end of the lever, and a pair of similarly loaded springs applied to the ends of the cross arm and serving to urge the lever into a position wherein it operates through the medium of the crank to center the wheel.

9. In combination with an airplane tail wheel structure including a tubular housing supported by the fuselage of the airplane, and provided at opposite sides thereof with outwardly extending brackets, a swivel type tail wheel beneath the housing, and an upstanding shaft provided at its lower end with mounting means for the wheel and having its upper end journaled in the housing, mechanism for effecting self-centering of the wheel comprising a crank connected to the shaft at a point adjacent the housing, a lever at one side of the housing and having one end thereof operatively connected to one end of the crank and its central portion fulcrumed, a cross arm having the central portion thereof connected to the other end of the lever, and a pair of similarly loaded springs at opposite sides of the lever extending between, and connected to, the brackets and the ends of the cross arm and serving to urge the lever into a position wherein it operates through the medium of the crank to center the wheel.

10. In combination with an airplane tail wheel structure including a tubular housing supported by the fuselage of the airplane, and provided at opposite sides thereof with outwardly extending brackets, a swivel type tail wheel beneath the housing, and an upstanding shaft provided at its lower end with mounting means for the wheel and having its upper end journaled in the housing, mechanism for effecting self-centering of the wheel comprising a crank connected to the shaft at a point adjacent the housing, a lever at one side of the housing and having one end thereof operatively connected to one end of the crank and its central portion fulcrumed, a cross arm having the central portion thereof connected to the other end of the lever, and a pair of spring assemblies in the form of compression springs and telescopic coverings around the springs extending between, and connected pivotally to, the brackets on the housing and the ends of the cross arm and serving to urge the lever into a position wherein it operates through the medium of the crank to center the wheel.

11. In combination with an airplane tail wheel structure including a tubular housing supported by the fuselage of the airplane and provided with an outwardly extending bracket, a swivel type tail wheel beneath the housing and an upstanding shaft provided at its lower end with mounting means for the wheel and having the upper end thereof journaled in the housing, automatic self-centering mechanism comprising a crank connected to the shaft at a point adjacent the housing, a lever having one end thereof pivotally connected to the outer end of the crank and having a longitudinally extending slot in its central portion, means at the outer end of the bracket extending through the slot and serving as a fulcrum for the lever while at the same time permitting the lever to slide longitudinally, and spring means applied to the other end of the lever for urging the lever into a position wherein it operates through the medium of the crank to center the wheel.

12. In combination with an airplane tail wheel structure including a tubular housing supported by the airplane fuselage provided with a pair of outwardly extending brackets at the sides thereof, and a third outwardly extending bracket between the pair of brackets, a tail wheel beneath the housing and an upstanding shaft provided at its lower end with mounting means for the wheel and having its upper end journaled in the housing so that it and the wheel are permitted to swivel, automatic self-centering mechanism for the wheel comprising a crank connected fixedly to the shaft at a point adjacent the housing and extending in the direction of said third bracket, a lever overlying said third bracket and having one end thereof pivotally connected to the outer end of the crank and a longitudinal slot in its central portion, pivot means on the outer end of the third bracket extending through the slot and serving as a fulcrum for the lever while at the same time permitting the lever to slide longitudinally, a cross arm having the central portion thereof connected to the other end of the lever, and a pair of springs at opposite sides of the lever extending between, and connected to, the pair of brackets and the ends of the cross arm and serving to urge the lever into a position wherein it operates through the medium of the crank to center the wheel.

13. In combination with an airplane tail wheel structure including a tubular housing supported by the airplane fuselage provided with a pair of outwardly extending brackets at the sides thereof, and a third outwardly extending bracket between the pair of brackets, a tail wheel beneath the housing and an upstanding shaft provided at its lower end with mounting means for the wheel and having its upper end journaled in the housing so that it and the wheel are permitted to swivel, automatic self-centering mechanism for the wheel comprising a crank connected fixedly to the shaft at a point adjacent the housing and extending in the direction of said third bracket, a lever overlying said third bracket and having one end thereof pivotally connected to the outer end of the crank and a longitudinal slot in its central portion, pivot means on the outer end of the third bracket extending through the slot and serving as a fulcrum for the lever while at the same time permitting the lever to slide longitudinally, a cross arm having the central portion thereof connected to the other end of the lever, and a pair of spring assemblies in the form of compression springs and telescopic coverings extending between, and pivotally connected to, the pair of brackets and the ends of the cross arm and serving to urge the lever into a position wherein it operates through the medium of the crank to center the wheel.

14. An automatic self-centering mechanism for a swivel type shaft having a ground wheel mounted thereon, consisting of a crank rigidly connected to, and projecting radially from, the shaft, a single lever having one of its portions pivotally connected to the crank and provided with a fulcrum, and means applied to the lever for urging it into a position wherein it operates through the medium of the crank to center the wheel.

JOHN M. HUDSON.